United States Patent [19]

Baxter

[11] 3,764,919

[45] Oct. 9, 1973

[54] AN N-ARY OF FLIP-FLOP CELLS INTERCONNECTED BY ROWS OF LOGIC GATES

[75] Inventor: Larry K. Baxter, Lexington, Mass.

[73] Assignee: Shintron Company, Inc., Cambridge, Mass.

[22] Filed: Dec. 22, 1972

[21] Appl. No.: 317,827

[52] U.S. Cl. .................... 328/91, 307/209, 307/215, 307/218, 328/92, 328/94, 328/97

[51] Int. Cl. ....................... H03k 19/04, H03k 19/06

[58] Field of Search .................... 307/207, 209, 215, 307/218; 328/91, 92, 94, 95, 97

[56] References Cited

UNITED STATES PATENTS

| | | | |
|---|---|---|---|
| 3,571,615 | 3/1971 | Kelly | 307/207 |
| 3,588,546 | 6/1971 | Lagemann | 307/215 |
| 3,609,569 | 9/1971 | Todd | 307/207 |
| 3,691,401 | 9/1972 | Foriani et al. | 307/207 |
| 3,700,916 | 10/1972 | Vittoz | 307/215 |
| 3,725,792 | 4/1973 | Kellogg | 307/215 |
| 3,728,534 | 4/1973 | Bertram et al. | 307/207 |

*Primary Examiner*—John W. Huckert
*Assistant Examiner*—Andrew J. James
*Attorney*—Louis Orenbuch et al.

[57] ABSTRACT

A n-ary flip-flop is constructed of a series of binary cells interconnected by two rows of logic gates. One row of logic gates provides a signal to a selected "set" cell when all cells to the left of the selected cell are reset and the other row of logic gates provides a signal to the selected cell when all cells to its right are in the reset state. The logic gate signals hold the selected cell in the "on" state after the original SET signal has decayed. When a different cell is placed in the set state, one row of logic gates propagates a signal to the right of that cell to reset all gates to the right while the other row concurrently propagates a signal in the other direction to reset all gates to the left. The n-ary flip-flop is modularly expandable inasmuch as cells can be readily added to both ends of the series of cells merely by connecting each added cell to the two rows of logic gates.

4 Claims, 9 Drawing Figures

N-ARY OF FLIP-FLOP CELLS INTERCONNECTED BY ROWS OF LOGIC GATES

FIELD OF THE INVENTION

This invention relates in general to electronic switching devices of the type employing binary cells which can reside in either one or two stable states. More particularly, the invention pertains to an n-ary flip-flop having its n cells arranged so that when any cell is put in the "set" state all the other cells are caused to be placed in the "reset" state.

BACKGROUND OF THE INVENTION

Conventional n-ary flip-flops, because of their arrangement, require each cell in the flip-flop to have a number of inputs approximately the total number of cells inasmuch as each cell must have its output coupled to an input of each of the other cells in the flip-flop. The conventional n-ary flip-flop quickly becomes unwieldy where the number of cells, *n*, is large. This can be appreciated by considering that in a conventional n-ary flip-flop having thirty cells, each cell must have at least 29 inputs, each of which is coupled to an output of a different one of the 29 other cells. Where it is desired to permit any of the 30 cells to be placed in the "set" state, each cell must have an additional input to which the "set" signal can be applied. The interconnections between cells in the conventional n-ary flip-flop therefore rapidly reaches the point where it becomes uneconomic to employ large numbers of cells.

THE INVENTION

The invention resides in an n-ary flip-flop capable of accommodating large numbers of cells without requiring that each cell have a large number of inputs. In the invention, the cells are arranged in a serial sequence interconnected by two rows of OR (or combination of gates that perform the OR function). One row of OR gates develops a signal to indicate that all cells to the left of a selected "set" cell are reset whereas the other row of OR gates develops a signal to indicate that all cells to the right of the selected cell are reset. Those signals are applied to the "set" cell and hold that cell in the "on" (i.e. set) state. When a different cell is placed in the set state, one row of OR gates propagates a signal to turn off (i.e. reset) all cells to the right of the selected cell while the other row of OR gates propagates a signal to turn off all cells to the left of the selected cell. The propagation time depends upon the number of cells in the series and upon the location of the "set" cell in the series.

Where each cell is deemed to be a "module", the n-ary flip-flop of the invention is modularly expandable simply by adding cells to either or both ends of the serial sequence. The cells are added to the series merely by connecting the cell to the two rows of OR gates. Therefore, the number of inputs or outputs from a cell is not affected by the addition or deletion of cells from the flip-flop.

THE DRAWINGS

The invention, both as to its arrangement and mode of operation, can be better understood from the detailed description which follows when it is considered in conjunction with the accompanying drawings in which FIG. 1 schematically depicts a conventional binary flip-flop employing two NOR gates;

FIG. 2 schematically depicts the conventional arrangement of a trinary flip-flop employing three NOR gates;

Figure 5:
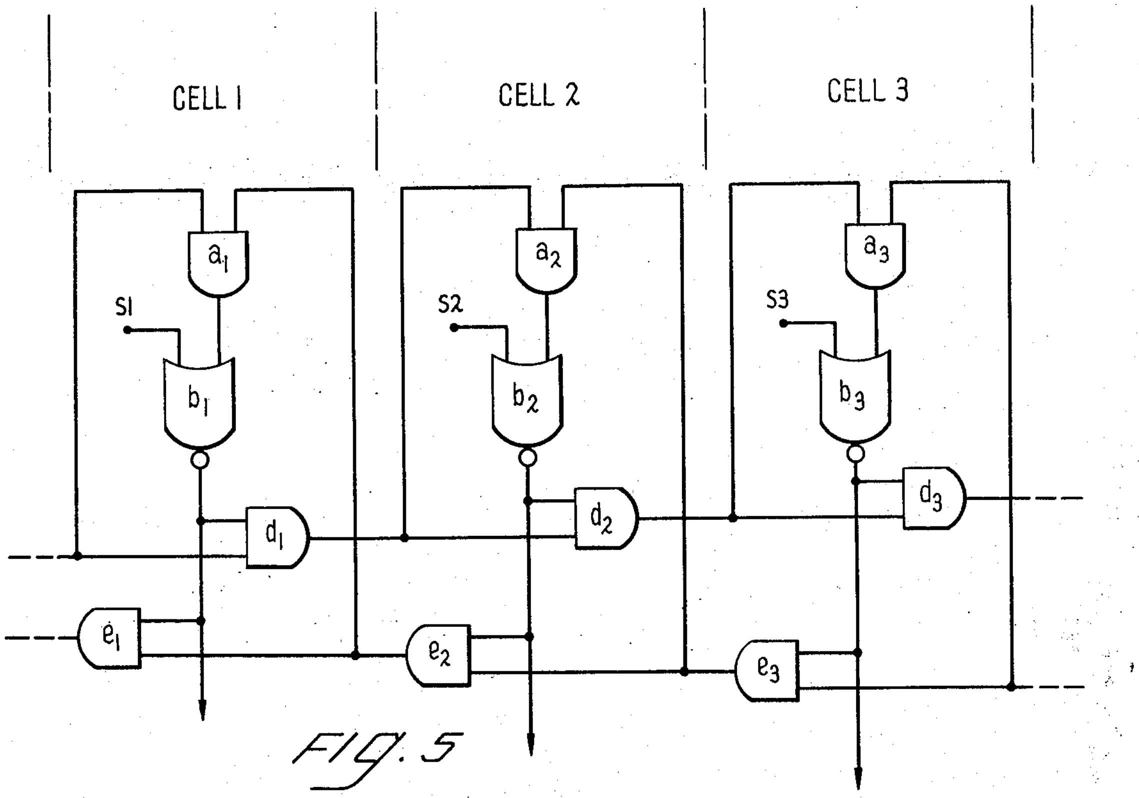
FIG. 5 shows an embodiment of the invention employing AND and NOR gates.
Figure 6:
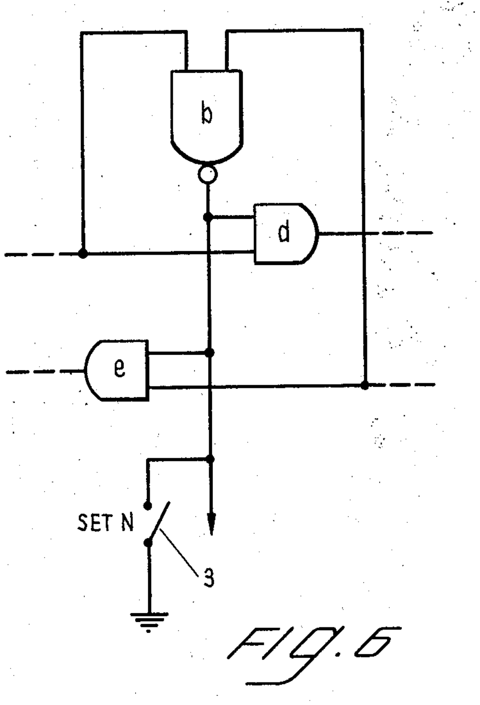
Figure 7:
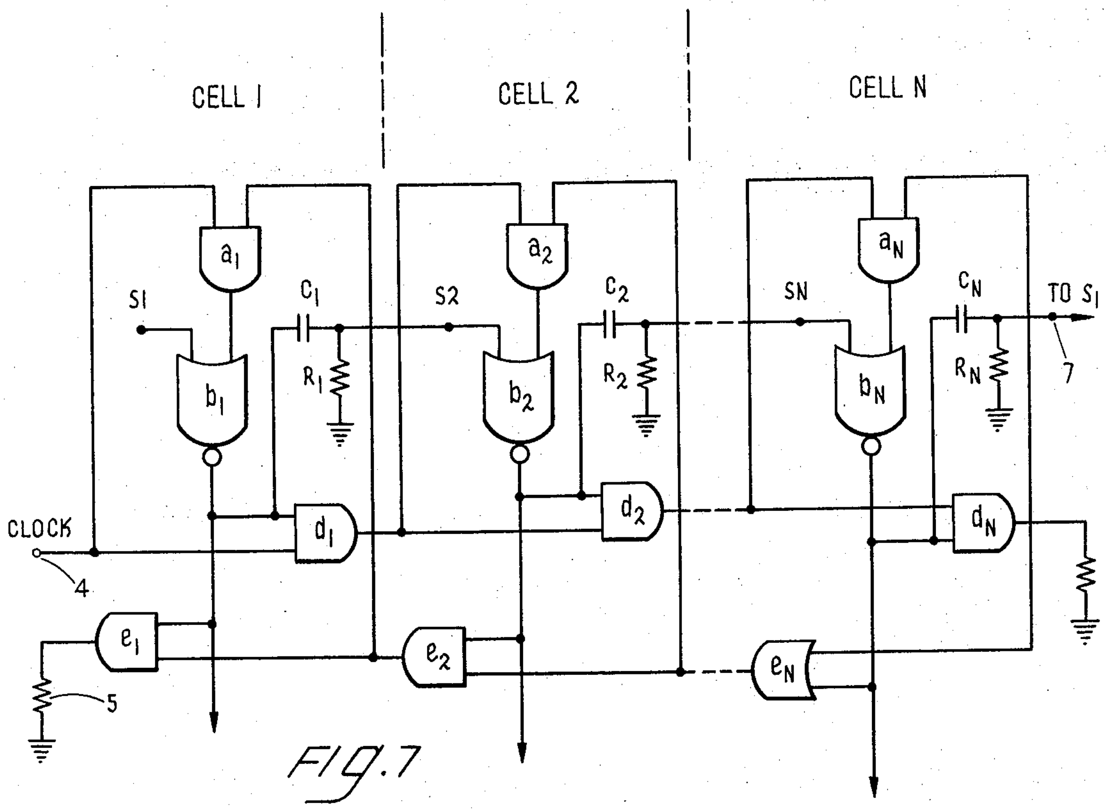
Figure 8:
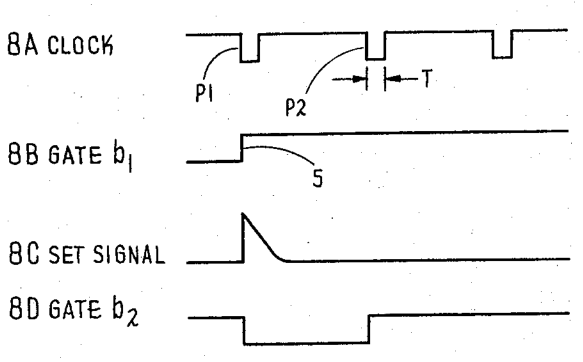

FIG. 6 schematically depicts a modified cell which can be used to replace the cells in the FIG. 5 embodiment;

FIG. 7 depicts the invention embodied in the form of a ring counter;

FIG. 8 shows waveforms occurring in the operation of the FIG. 7 embodiment; and

Figure 9:
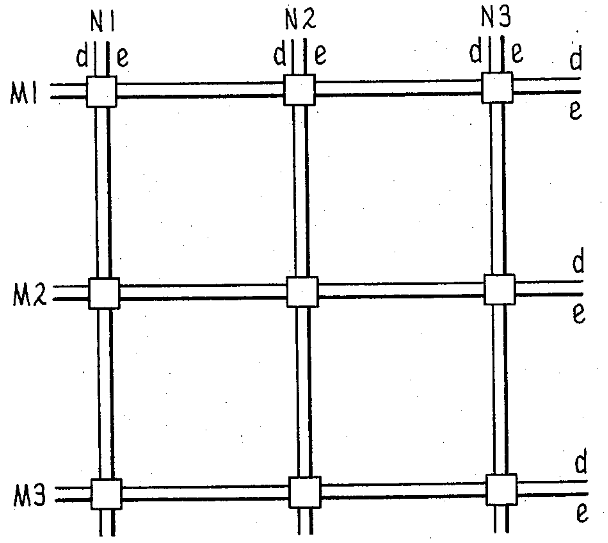

FIG. 9 shows the invention embodied in a two dimensional array of cells.

DETAILED DESCRIPTION

The conventional binary flip-flop can be considered as having two cells, one of which is ON when the other cell is OFF. Consider, for example, the R-S flip-flop schematically shown in FIG. 1 which utilizes two NOR gates 1 and 2. Gate 1 has its output applied to the reset (R) input of gate 2 and gate 2, similarly, has its output applied to the reset (R) input of gate 1. Assuming both inputs to gate 2 are low (where low corresponds to a binary ZERO), the output of NOR gate 2 is high (where high corresponds to a binary ONE). The R input of gate 1 is therefore high, forcing the output of gate 1 to be low. If a binary ONE signal is applied to the S input of gate 2, the output of gate 2 goes low and causes NOR gate 1 to switch to its other state.

Figure 1:
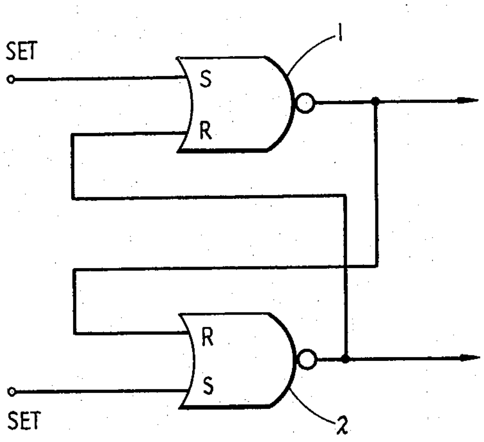

The binary flip-flop of FIG. 1 can be expanded in a straight-forward manner to a trinary flip-flop (viz. a flip-flop having three cells) or to an n-ary flip-flop where *n* can be any number of cells. The trinary flip-flop depicted in the logic diagram of FIG. 2 utilizes three NOR gates G1, G2, G3. Each of those gates has four inputs. One input of gate G1 is connected to the output of gate G2, another input of gate G1 is connected to the output of gate G3, a third input of gate G1 is connected to set terminal T2, and the remaining input is connected to set terminal T3. In a similar manner, gate G2 has its inputs connected to the outputs of gates G1, G3 and to set terminals T1 and T3. Gate G3, similarly, has its inputs connected to the outputs of gates G1, G2, and to set terminals T1 and T2. Because of the manner in which the gates are connected, when the output of one gate is high, the other gates are in the state where their outputs are low. For example, where all the inputs to gate G1 are low, its output is high, causing gates G2 and G3 to be held in the state where their outputs are low. The behavior of the cells is similar for all of the gates. Applying a "set" signal to terminal T2 or T3 causes gate G1 to change to the state where its output is low.

Figure 2:
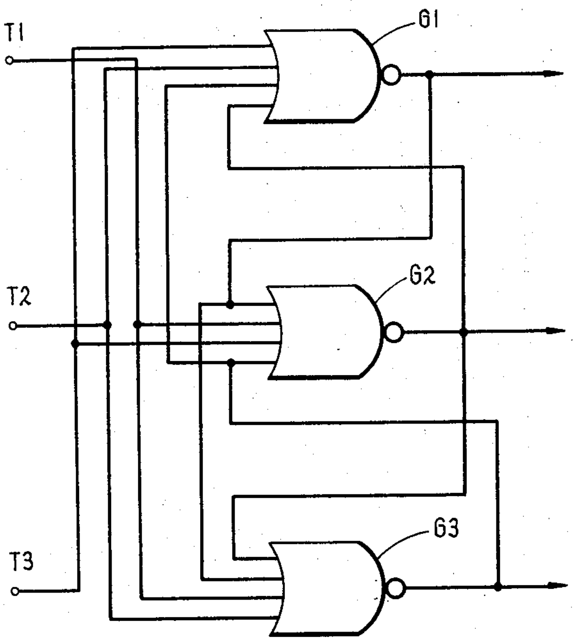

For an n-ary flip-flop, where n is small, the logic arrangement of FIG. 2 is optimum. The arrangement quickly becomes unwieldy, however, where n is large. For example, where $n$=30, each gate must have 30 or more inputs.

Figure 3:
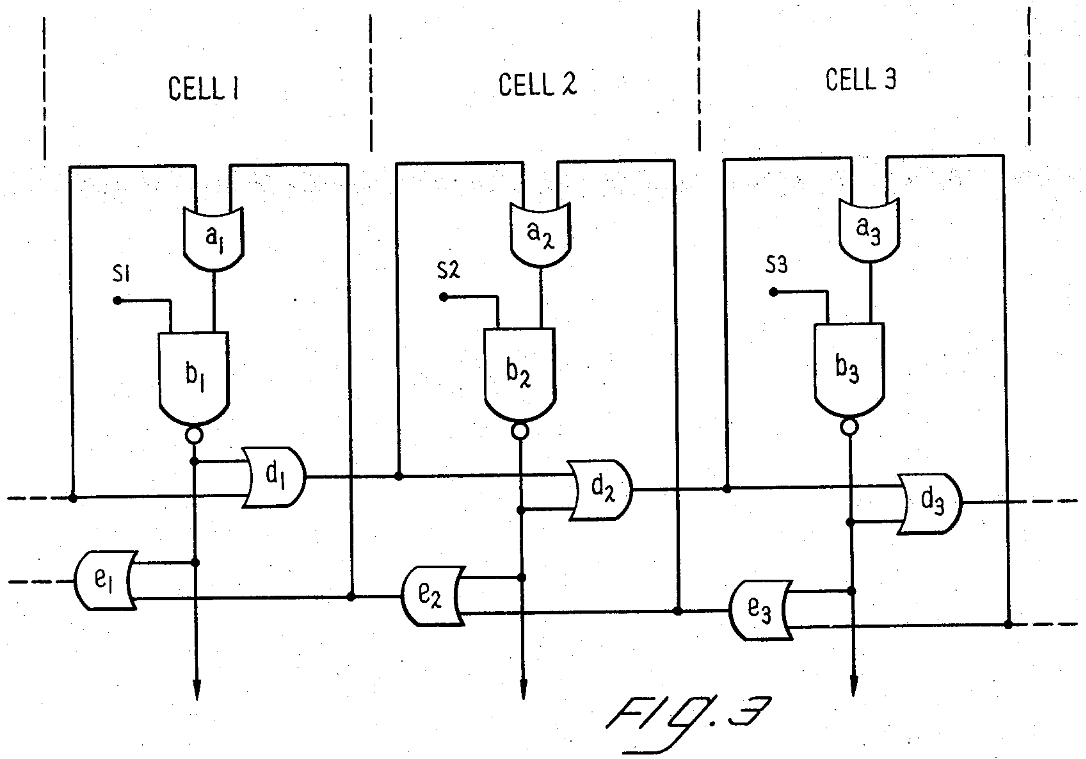
FIG. 3 shows the scheme of an n-ary flip-flop arranged in accordance with the invention.

FIG. 3 schematically depicts an arrangement which acts as an n-ary flip-flop and is structurally simpler than the FIG. 2 arrangement when n is large. Each cell in the FIG. 3 arrangement employs a NAND gate *b*, and OR gates *a*, *c*, and *d*. Each of the gates has two inputs. For ease of exposition gates in cell 1 are identified by the subscript 1, gates in cell 2 are identified by the subscript 2, etc. Inasmuch as the cells are identical, only one cell is here described in detail. NAND gate $b_1$ has one of its two inputs connected to terminal S1 at which a signal can be applied to "set" the cell to one state. The other input of gate $b_1$ is coupled to the output of OR gate $a_1$ whereby the cell can be "reset" to its other state. The output of NAND gate $b_1$ is fed to an input of OR gate $C_1$ and to an input of OR gate $d_1$. The other input of gate $c_1$ is connected to the output of OR gate $c_2$ in the adjacent cell. The output of $c_1$, similarly, provides an input signal to the cell (not shown) at the left of cell 1. Gate $d_1$ has its other input connected to the output of the corresponding d gate in the left cell. Gate $a_1$ has one input connected to the output of OR gate $c_2$ and its other input connected to the output of the *d* gate in the left cell. OR gates $d_1$, $d_2$, $d_3$ . . . form a series of gates for propagating a signal from left to right as viewed in FIG. 3 whereas OR gates $c_1$, $c_2$, $c_3$ . . . form a series of gates for propagating a signal in the reverse direction.

In the initial condition, it is assumed that cell 3 is in the "set" state and all the other cells are in the "reset" state. In the "set" state, the output of the cell is high whereas in the "reset" state the output of the cell is low. Thus, in the initial condition, it is assumed that the output of gate $b_3$ is high and the outputs of $b_1$ and $b_2$ are low. Consequently, the output of gate $d_3$ and all *d* gates to its right have high outputs whereas all *d* gates to its left have low outputs. In contrast, the output of gate $c_3$ and all *c* gates to its left are high whereas all *c* gates to its right have low outputs. The input to gate $a_1$ from gate $c_2$ is a high signal where the other input signal to gate $a_1$ is low. Similarly, gate $d_1$ applies a low signal to gate $a_2$ whereas gate $c_3$ applies a high signal to gate $a_2$. The output signals from gates $a_1$ and $a_2$, in the initial condition, are high.

Where the signal at terminal S1 is changed from a high to a low, gate $b_1$ changes state and its output goes high. Cell 1 thereupon causes gates $d_1$ and $d_2$ to propagate a high signal to the right which causes cell 3 to be reset. The resetting of cell 3 causes a low signal to propagate through gate $c_3$ toward the left. When gate $c_2$ goes low, both inputs to gate $a_1$ are then low. Consequently, the output of OR gate $a_1$ becomes low so that cell 1 remains in its set state after the low signal at terminal S1 is removed. The low signal applied at terminal S1 thus need be applied only for the time needed for a signal to propagate from the "reset" cell to the "set" cell through the series of OR gates.

An important attribute of the FIG. 3 arrangement is that it is modularly expandable. That is, considering each cell to be a "module", cells can be added onto one or both ends of the chain to expand the chain. For example, if 100 cells were added serially to the right of cell 3 in FIG. 3, the ONE level indicating cell 1 is set propagates through all 100 additional *d* gates to reset all cells. When the 100th cell is reset (or sooner if an earlier cell stored the ONE), a ZERO logic level travels from right to left through the c gates and when it reaches cell 1 the low signal applied at terminal S1 can be removed.

Figure 4:
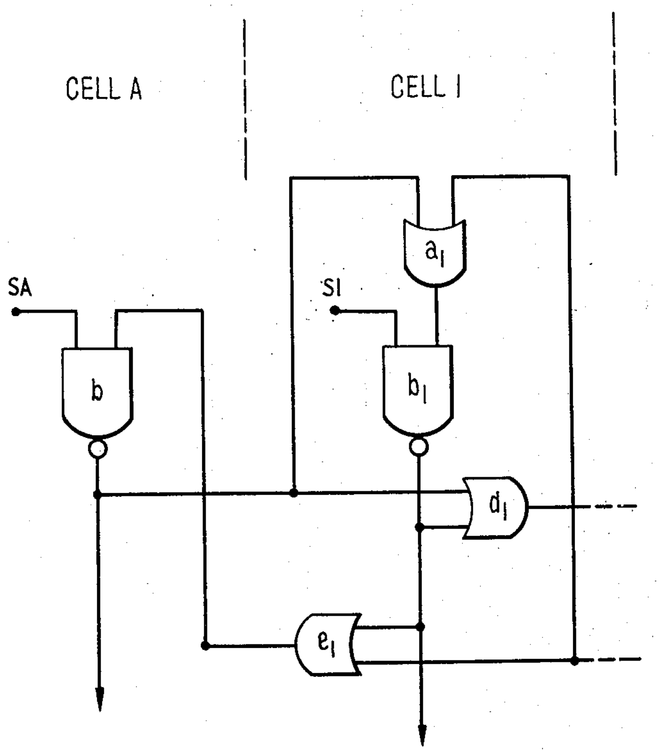
FIG. 4 illustrates an arrangement for simplifying the end cells in the FIG. 3 n-ary serial arrangement.

The cells at each end of the chain can be simplified by retaining only the NAND gate b and eliminating the OR gates *a*, *d*, and *e*. For example, where cell A, shown in FIG. 4, is an end cell of a chain of cells interconnected in the manner of the FIG. 3 embodiment, the cell A need only employ the NAND gate *b*. The *e* gate is eliminated since it is not necessary to propagate a signal to the left of cell A. The output of gate *e* is fed directly to one input of gate b and the output of gate *b* is fed directly to an input of gates $a_1$ and $d_1$.

Inasmuch as transistor to transistor logic (TTL) does not at present include the OR function, the FIG. 3 embodiment may be modified to employ a positive AND gate as a negative logic OR gate. The modified embodiment is shown in FIG. 5 where gates *a*, *d*, and *e* are positive AND gates and the b gates are NOR gates which are "set" by applying a high signal (viz. a binary ONE level signal) to the S input. In the n-ary flip-flop, when one cell is in the "set" state, all the other cells are in the "reset" state. In the FIG. 5 embodiment, cell 2 is assumed to be in the "set" state and all the other cells are assumed to be in the reset state. Initially, therefore, the output of NOR gate $b_2$ is low and the outputs of the other NOR gates $b_1$, $b_3$, etc. are high. The output of gate $d_2$ and all d gates to its right are low whereas the output of all *d* gates to its left and high. In contrast, the output of gate $e_2$ and *e* gates to its left are low whereas the output of all e gates to the right of gate $e_2$ are high. The two inputs to gate $a_2$ are therefore both high and the output of AND gate $a_2$ is high. Consequently, the output of NOR gate $b_2$ is held low despite the absence of a "set" signal at terminal S2.

Assuming a "set" signal (i.e. a ONE level signal) is applied to terminal S1, the output of gate $b_1$ is forced low. AND gate $d_1$, thereupon applied a low signal to gate $a_2$, causing the output of gate $a_2$ to go low. Gate $b_2$ thereupon goes high and causes gate $e_2$ to emit a high signal indicating that cell 2 has been "reset". Both inputs to gate $a_1$ are now high, causing the output of that gate to be high. The output of gate $b_1$ is, consequently, held low even after the set signal at terminal S1 is removed.

Each of the cells in the FIG. 5 embodiment can be replaced by the cell depicted in FIG. 6. In the FIG. 6 cell, the a gate is eliminated and the inputs formerly connected to that gate are applied directly to the inputs of NAND gate *b*. In the "reset" state the output of the NAND gate is high. Assuming the ZERO logic level is ground, the cell is "set" by closing switch 3 to ground the output of the NAND gate.

The invention can be embodied in the form of a sequential switcher or a ring counter by the addition of RC (resistance capacitance) networks to an n-ary flip-flop embodiment. FIG. 7, by way of example, shows the n-ary flip-flop of FIG. 5 modified to act as a clocked sequential switcher. Assuming it is intended to have the cells switch in sequence toward the right as viewed in FIG. 7, the output of each cell is connected by an RC network to the "set" input of the next cell to the right. For ease of exposition, the end cell at the right of the chain is designated cell N and the capacitors C and resistors R are identified by subscripts in the same manner as the gates.

For the initial condition, it is assumed cell 1 is in the "set" state and all the other cells are in the "reset" state. In the "set" state the output of the NOR gate *b* in the cell is low whereas in the "reset" state the output of the NOR gate is high. To cause a "reset" cell to be set, a high signal must be applied to at least one of the inputs of the NOR gate. At input terminal 4, a train of clock pulses are applied to cause the cells to switch in sequence. The clock pulses are negative going pulses, indicated in FIG. 8A, which drop the high logic level at terminal 4 to the low logic level during each pulse period $t$. The pulse period t is shorter than the time constant of the RC networks.

In the initial condition, the output of gate $d_1$ and the output of all gates to its right are low. With the exception of gate $e_1$, the outputs of all the $e$ gates are high. Gate $e_1$ can be eliminated if desired, but where all cells are identical in construction, it may be expedient to simply ground the output of cell $e_1$ through a load resistor 5. The two inputs to gate $a_1$ are high, causing the output of that AND gate to emit a high signal which holds NOR gate $b_1$ in the "set" state after the "set" signal at terminal S1 has been removed.

Upon the application of clock pulse P1 to terminal 4, cell 1 is reset whereupon the output of gate $b_1$ goes high, as indicated by the waveform in FIG. 8B. The $R_1C_1$ network differentiates the wavefront 5, causing a "set" signal to be applied to the input S2 of cell 2. The differentiated "set" signal, indicated in FIG. 8C, holds the input S2 high after pulse P1 decays because of the time constant of the RC network. Consequently, cell 2 is put into the "set" state whereas cell 1 is reset. The normal operation of the n-ary flip-flop, previously described, causes cell 2 to be held in the "set" state until the next clock pulse P2 causes cell 2 to be reset as indicated in FIG. 8D and transfer the "set" state to the next cell in the chain. Thus, each cell in the chain, in its turn, is placed in the "set" state and the "set" state is advanced one cell with each clock pulse.

When the end cell at the right of the chain is reset, a random one of the cells will, in the absence of other arrangements, assume the "set" state. To guarantee recirculation through the first cell in the chain, an electrical connection is made from terminal 7 to the input S1 of cell 1.

While the cells in the embodiments thus far described are arranged in a single chain to form a one dimensional array, the cells can be arranged as shown in FIG. 9 to form a two dimensional array which can, for example, be employed to control a telephone exchange crossbar switch. In the two dimensional array the cells are arranged in rows M1, M2, M3 . . . and in columns N1, N2, N3 . . . interconnected by the lines of $d$ and $e$ gates. Setting any cell ($N_i$, $M_i$) resets all the other cells in column $N_i$ and row $M_i$.

It is apparent that the cells can be arranged in a three or n-dimensional array, limited only by the "fan-out" of the $d$ and $e$ gates.

Although several embodiments of the invention are here illustrated and described, it is apparent that the invention can take other forms and that changes can be made in the illustrated embodiments which do not alter the essential nature of the invention. It is therefore intended that the scope of the invention be delimited by the appended claims and encompass those devices only which come within the defined domain and utilize the invention.

I claim:

1. An n-ary flip-flop comprising $n$ cells, each cell having two stable states and residing in one or the other of those states except when in transition from one state to the other, the cells being arranged in series, a first row of gates for propagating a signal in one direction along the serially arranged cells, each gate in the first row being associated with a different cell and receiving an input from that cell, each gate having its output connected to an input of the next succeeding gate in the row and to an input of the cell associated with that next gate whereby when a cell is placed in one stable state, its associated first row gate causes a signal to propagate along the row in said one direction which causes the other cells in that direction to remain in or be reset to the other stable state, a second row of gates for propagating a signal along the serially arranged cells in the direction opposite to said one direction, each gate in the second row being associated with a different cell and receiving an input from that cell, each gate of the second row having its output connected to an input of the next succeeding gate in that row and to an input of the cell associated with that next gate whereby when a cell is placed in said one stable state, its associated second row gate causes a signal to propagate along that row in said opposite direction which causes the other cells in that direction to remain in or be reset to the other stable state.

2. The n-ary flip-flop according to claim 1 wherein the first and second rows of gates apply signals to the cell placed in said one stable state which holds that cell in said one stable state when all the other cells are reset to the other stable state.

3. The n-ary flip-flop according to claim 2 wherein each cell has an input terminal through which a signal can be applied to cause the cell to be set in said one stable state.

4. The n-ary flip-flop according to claim 1 wherein each cell has an input terminal through which a signal can be applied to cause the cell to be set in said one stable state, signal transfer means coupling the output of each preceding cell in the series to the input terminal of the next succeeding cell in the series whereby the succeeding cell can be placed in said one stable state by a signal from the preceding cell, and a source of clock pulses connected to the first row of gates for causing reset signals to propagate along that row of gates.

* * * * *

UNITED STATES PATENT OFFICE
CERTIFICATE OF CORRECTION

Patent No. 3,764,919 Dated October 9, 1973

Inventor(s) Larry K. Baxter

It is certified that error appears in the above-identified patent and that said Letters Patent are hereby corrected as shown below:

Column 1, line 16, "approximately" should read

-- approximating --.

Column 3, line 3, "c, and d" should read -- d, and e --;

line 13, "$C_1$" should read -- $e_1$ --;

line 14, "$c_1$" should read -- $e_1$ --;

line 15, "$c_2$" should read -- $e_2$ --;

line 15, "$c_1$" should read -- $e_1$ --;

line 19, "$c_2$" should read -- $e_2$ --;

line 24, "$c_1, c_2, c_3$" should read -- $e_1, c_2, c_3$ --;

line 35, "$c_3$" should read -- $e_3$ --;

line 36, both occurrences "c" should read -- e --;

line 38, "$c_2$" should read -- $e_2$ --;

line 40, "$c_3$" should read -- $e_3$ --;

line 48, "$c_3$" should read -- $e_3$ --;

line 48, "$c_2$" should read -- $e_2$ --.

Signed and sealed this 30th day of April 1974.

(SEAL)
Attest:

EDWARD M.FLETCHER,JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334.